United States Patent
Pergantis et al.

(10) Patent No.: US 10,821,583 B2
(45) Date of Patent: Nov. 3, 2020

(54) SPRING LOADED PILOT PUNCH ASSEMBLY

(71) Applicant: United Technologies Corporation, Farmington, CT (US)

(72) Inventors: John Pergantis, Manchester, CT (US); Zachary Sears, Putnam, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 415 days.

(21) Appl. No.: 15/672,715

(22) Filed: Aug. 9, 2017

(65) Prior Publication Data
US 2018/0272514 A1   Sep. 27, 2018

Related U.S. Application Data

(60) Provisional application No. 62/476,096, filed on Mar. 24, 2017.

(51) Int. Cl.
| | |
|---|---|
| *B25B 27/04* | (2006.01) |
| *F16B 33/00* | (2006.01) |
| *B25B 11/00* | (2006.01) |
| *F16B 37/12* | (2006.01) |
| *F01D 25/24* | (2006.01) |
| *F01D 25/28* | (2006.01) |
| *F16B 21/18* | (2006.01) |
| *B25B 23/00* | (2006.01) |
| *B25C 9/00* | (2006.01) |
| *B25C 1/02* | (2006.01) |
| *B26F 1/32* | (2006.01) |

(52) U.S. Cl.
CPC .............. *B25B 27/04* (2013.01); *B25B 11/00* (2013.01); *F16B 33/002* (2013.01); *B25B 23/0085* (2013.01); *B25C 1/02* (2013.01); *B25C 9/00* (2013.01); *B26F 1/32* (2013.01); *F01D 25/243* (2013.01); *F01D 25/28* (2013.01); *F05D 2230/64* (2013.01); *F16B 21/18* (2013.01); *F16B 37/12* (2013.01)

(58) Field of Classification Search
CPC .... B25D 1/16; B25D 5/00; B25C 9/00; B25C 1/02; B25B 23/0085; B25B 27/0092; B25B 27/04; F16B 3/04
USPC .................. 29/439; 81/44; 227/146, 147
See application file for complete search history.

(56) References Cited

U.S. PATENT DOCUMENTS

| 473,873 | A | * | 4/1892 | Godfrey | .................. B25C 1/003 |
| | | | | | 227/137 |
| 541,038 | A | * | 6/1895 | Clark | .................. B25C 1/02 |
| | | | | | 227/147 |
| 824,867 | A | | 7/1906 | Houghton | |
| 2,199,833 | A | * | 5/1940 | Fleischman | ............... B25C 1/02 |
| | | | | | 227/147 |

(Continued)

FOREIGN PATENT DOCUMENTS

| DE | 19938923 | A1 | * | 3/2001 | ............... B25C 1/02 |
| EP | 0060158 | A1 | * | 9/1982 | ............. B25C 1/188 |

*Primary Examiner* — Stephen F. Gerrity
*Assistant Examiner* — Joshua G Kotis
(74) *Attorney, Agent, or Firm* — Bachman & LaPointe, P.C.

(57) ABSTRACT

A punch assembly includes a punch that defines an axis and a sleeve that is spring biased to the punch, the sleeve movable axially along the axis between a compressed position and an extended position.

8 Claims, 17 Drawing Sheets

(56) References Cited

U.S. PATENT DOCUMENTS

| | | | | |
|---|---|---|---|---|
| 2,229,868 A * | 1/1941 | Newell, Sr. | B25C 1/02 | 227/147 |
| 2,258,861 A * | 10/1941 | Park | B25C 1/02 | 227/147 |
| 2,430,532 A * | 11/1947 | Rayburn | B22C 21/14 | 227/142 |
| 2,475,936 A * | 7/1949 | Allen | B25C 1/02 | 227/147 |
| 2,586,087 A * | 2/1952 | Reynolds | F16C 33/785 | 29/898.11 |
| 2,587,944 A * | 3/1952 | Williams | B25D 11/00 | 173/115 |
| 2,833,052 A * | 5/1958 | Foster | B25D 5/00 | 33/671 |
| 2,979,092 A * | 4/1961 | Bradford | B25C 9/00 | 81/44 |
| 3,060,440 A * | 10/1962 | De Caro | B25C 1/02 | 227/147 |
| 3,119,423 A * | 1/1964 | Weick | B25F 1/02 | 7/167 |
| 3,791,034 A | 2/1974 | Carver | | |
| 4,316,513 A * | 2/1982 | Harris | E21F 9/00 | 173/91 |
| 4,470,440 A * | 9/1984 | Thor | B27L 7/005 | 144/195.5 |
| 5,433,007 A | 7/1995 | Clark et al. | | |
| 5,605,271 A * | 2/1997 | Russell | B25C 1/02 | 173/90 |
| 6,402,007 B1 * | 6/2002 | Dyer | B25C 1/02 | 227/113 |
| 6,446,318 B1 * | 9/2002 | Foose | B25B 27/0078 | 29/275 |
| 2002/0148120 A1 * | 10/2002 | Welch | B25D 5/00 | 30/367 |
| 2003/0000991 A1 * | 1/2003 | Estes | B25B 31/00 | 227/147 |
| 2005/0211452 A1 * | 9/2005 | Andersen | B25D 1/00 | 173/90 |
| 2006/0213014 A1 * | 9/2006 | Manske | B25B 15/00 | 7/165 |
| 2010/0127036 A1 * | 5/2010 | Marschel | B25C 3/008 | 227/146 |
| 2011/0100664 A1 * | 5/2011 | Lin | B25C 9/00 | 173/162.2 |
| 2019/0061128 A1 * | 2/2019 | Hultgren | B25C 1/02 | |

* cited by examiner

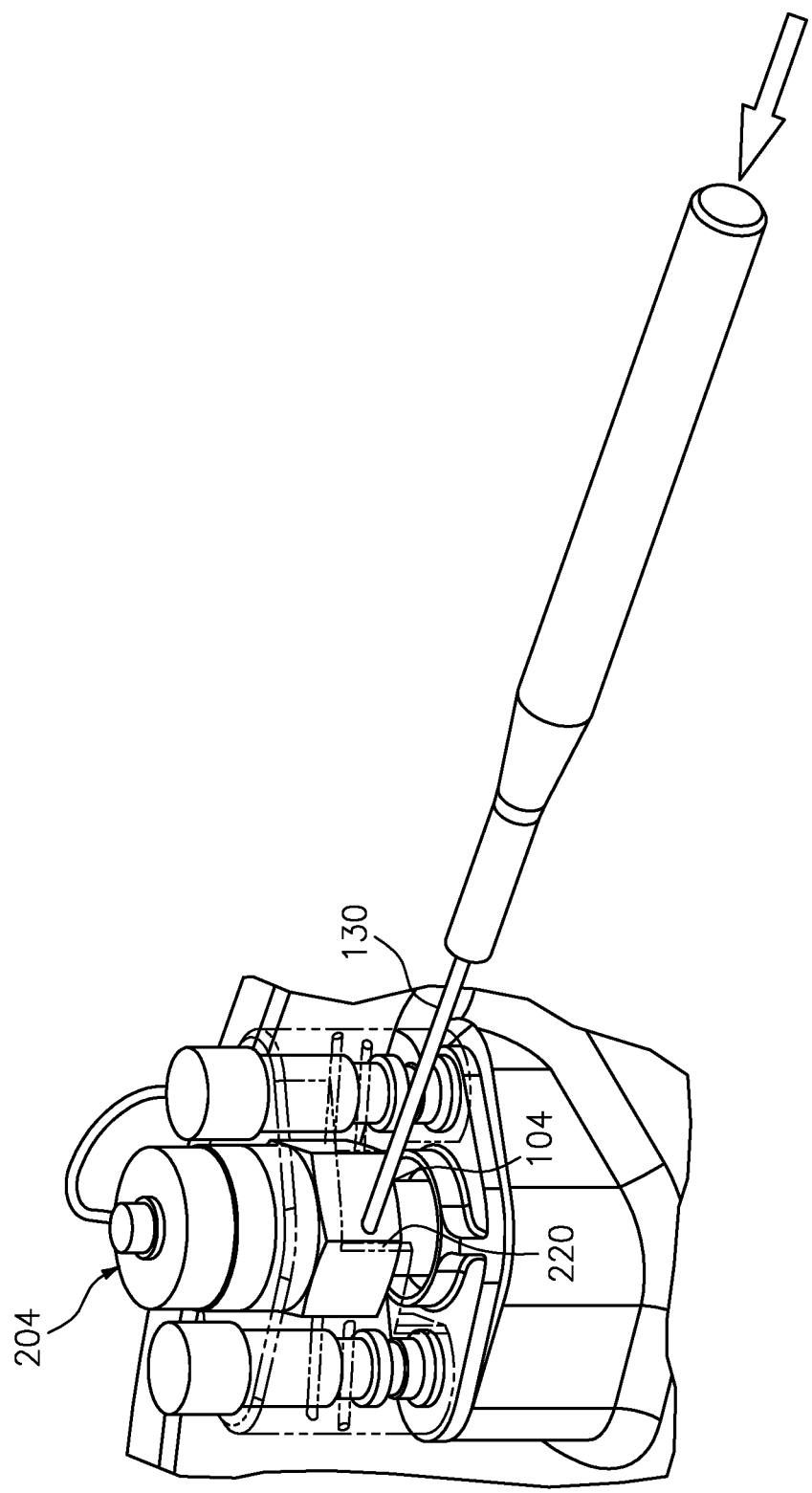

SPRING LOADED PILOT PUNCH ASSEMBLY

CROSS-REFERENCE TO RELATED APPLICATION

Benefit is claimed of U.S. Patent Application No. 62/476,096, filed Mar. 24, 2017, and entitled "Spring Loaded Pilot Punch Assembly", the disclosure of which is incorporated by reference herein in its entirety as if set forth at length.

BACKGROUND

The present disclosure relates to a tool and associated methods for assembly of a coupling fitting to a supply tube that extends through a case of the gas turbine engine, and more particularly to a pilot punch assembly.

A turbine intermediate case (TIC) of a gas turbine engine typically includes a plurality of hollow vanes arranged in a ring-vane-ring structure. The rings define inner and outer boundaries of a core gas path while the vanes are disposed across the gas path. Tie rods extend through the hollow vanes to interconnect an engine mount ring and a bearing compartment.

Oftentimes, plumbing such as for lubrication also passes though the hollow vanes. The plumbing often includes a B-nut to facilitate maintenance. "B-nut" is the common description of a coupling fitting that is used to connect fluid lines and hoses. Although a relatively simple component, the B-nut performs a critical function. However, installation of the supply tube, associated B-nut and thrust wire may be a time consuming and tedious process that typically requires multiple technicians.

A pilot punch used with a hammer is required to pilot and install a thrust wire into and through the B-nut to retain the components. Although effective, typically two technicians are required to minimize the likelihood that a standard pilot punch will slip off the wire and cause damage to surrounding areas.

SUMMARY

A punch assembly according to one disclosed non-limiting embodiment of the present disclosure includes a punch that defines an axis; and a sleeve that is spring biased to the punch, the sleeve movable axially along the axis between a compressed position and an extended position.

A further aspect of the present disclosure includes that the sleeve is retained to the punch by a pin that fits through a slot in the punch.

A further aspect of the present disclosure includes that the slot defines the axial distance between the compressed position and the extended position.

A further aspect of the present disclosure includes that the punch comprises a handle section adjacent to a sleeve receipt section along the axis, a spring section, and a pin punch section, the spring section between the sleeve receipt section and the pin punch section.

A further aspect of the present disclosure includes that the sleeve includes a guide section which defines a diameter to slide along the sleeve receipt section.

A further aspect of the present disclosure includes that the sleeve comprises a thrust wire receipt section adjacent the guide section, the guide section smaller in diameter than the thrust wire receipt section.

A further aspect of the present disclosure includes that the guide section is axially located to abut a stop surface when the sleeve is compressed along the axis to the compressed position.

A further aspect of the present disclosure includes that the stop surface is a step transition between the spring section and the pin punch section.

A punch assembly according to one disclosed non-limiting embodiment of the present disclosure includes a punch that comprises a handle section adjacent to a sleeve receipt section along an axis, a spring section, and a pin punch section, the spring section between the sleeve receipt section and the pin punch section; a sleeve that is spring biased to the punch, the sleeve comprising a guide section which defines a diameter to slide along the sleeve receipt section, a thrust wire receipt section adjacent the guide section, the guide section smaller in diameter than the thrust wire receipt section; and a spring over the spring section and between the pin punch section and the sleeve such that the sleeve is movable axially along the axis between a compressed position and an extended position.

A further aspect of the present disclosure includes that the guide section is axially located to abut a stop surface when the sleeve is compressed along the axis to the compressed position.

A further aspect of the present disclosure includes that the stop surface is a step transition between the spring section and the pin punch section.

A further aspect of the present disclosure includes that the sleeve is retained to the punch by a pin that fits through a slot in the punch.

A further aspect of the present disclosure includes that the slot defines the axial distance between the compressed position and the extended position.

A method to install a coupling fitting according to one disclosed non-limiting embodiment of the present disclosure includes receiving a sleeve of a punch assembly onto a tab end of a tabbed thrust wire, the sleeve movable axially along an axis between an extended position and a compressed position.

A further aspect of the present disclosure includes installing the tabbed thrust wire into a groove formed by the semi-circular groove in the coupling fitting and the semi-circular groove in the supply tube; and placing a coupling fitting over a supply tube, wherein axially positioning the coupling fitting includes defining an interface length with a cap to axially locate the coupling fitting within a coupling aperture to axially locate the coupling fitting such that a semi-circular groove in the coupling fitting is aligned with a semi-circular groove in the supply tube;

A further aspect of the present disclosure includes mounting a tool body to a boss; receiving the coupling fitting within a coupling aperture of the tool body to rotationally retain the coupling fitting; inserting the cap into the coupling aperture; and threading the cap into the coupling fitting to axially position the coupling fitting;

A further aspect of the present disclosure includes hammering the punch assembly until the sleeve is moved axially along the axis between the extended position and the compressed position.

A further aspect of the present disclosure includes threading a fastener through a tool body.

A further aspect of the present disclosure includes threading a fastener through the tool body and onto a respective distal end of a bolt that retains a flange to the boss for mounting the tool body to the boss.

A further aspect of the present disclosure includes placing the coupling fitting over a supply tube.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 13 is a perspective view of the thrust wire being hammered into the coupling fitting while being retained by the tool assembly.

DETAILED DESCRIPTION

Figure 1:
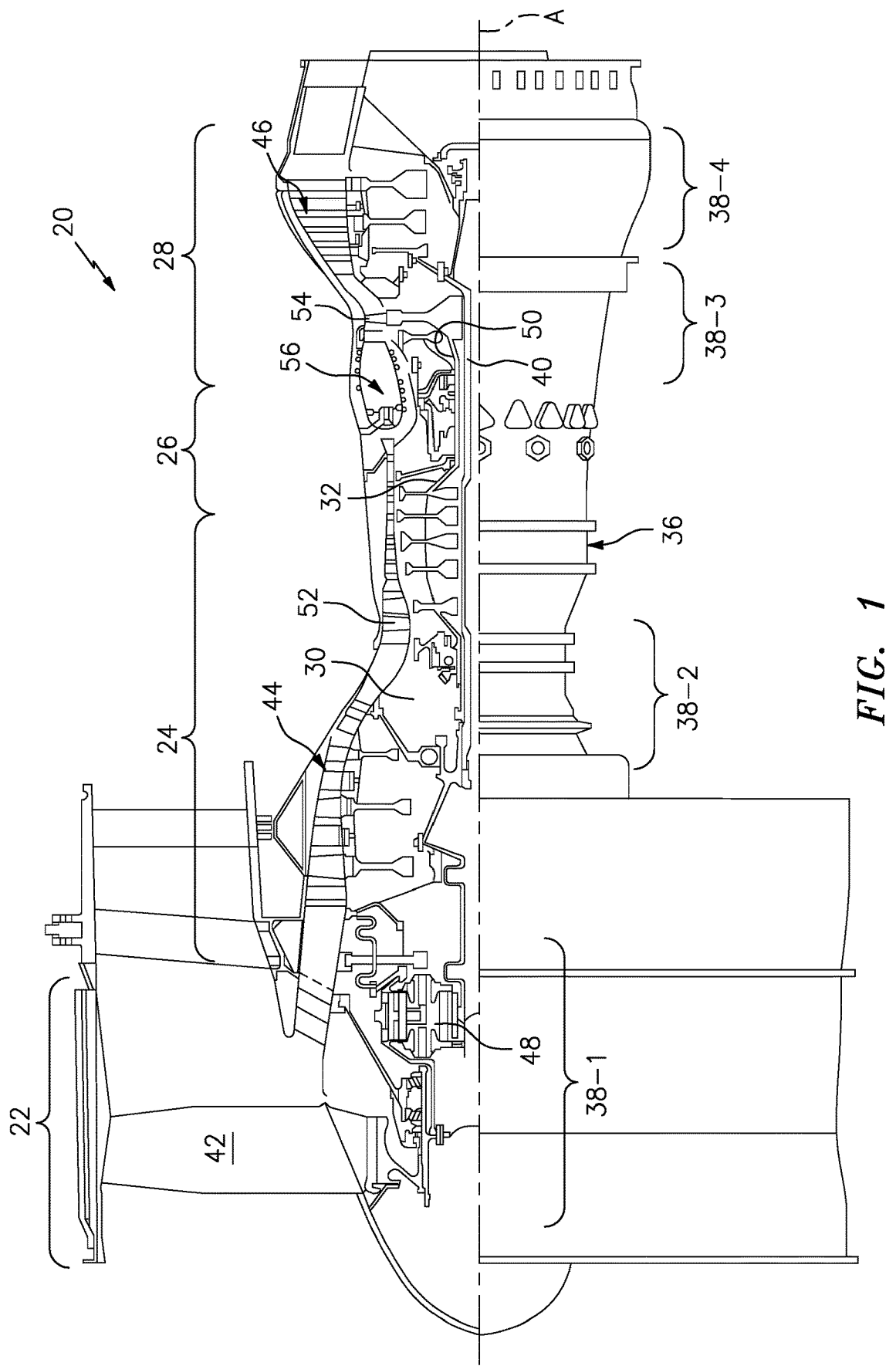
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures such as a low-bypass turbofan may include an augmentor section among other systems or features. Although schematically illustrated as a turbofan in the disclosed non-limiting embodiment, it should be appreciated that the concepts described herein are not limited to use with turbofans as the teachings may be applied to other types of turbine engines to include but not be limited to a three-spool (plus fan) engine wherein an intermediate spool includes an intermediate pressure compressor ("IPC") between a low pressure compressor and a high pressure compressor with an intermediate pressure turbine ("IPT") between a high pressure turbine and a low pressure turbine as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26 then expansion through the turbine section 28. The engine 20 generally includes a low spool 30 and a high spool 32 mounted for rotation about an engine central longitudinal axis A relative to an engine case assembly 36 via several bearing compartments 38-1, 38-2, 38-3, 38-4.

The low spool 30 generally includes an inner shaft 40 that interconnects a fan 42, a low-pressure compressor ("LPC") 44, and a low-pressure turbine ("LPT") 46. The inner shaft 40 drives the fan 42 through a geared architecture 48 to drive the fan 42 at a lower speed than the low spool 30. The high spool 32 includes an outer shaft 50 that interconnects a high-pressure compressor ("HPC") 52 and high-pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 drive the respective high spool 32 and low spool 30 in response to the expansion.

Figure 2:
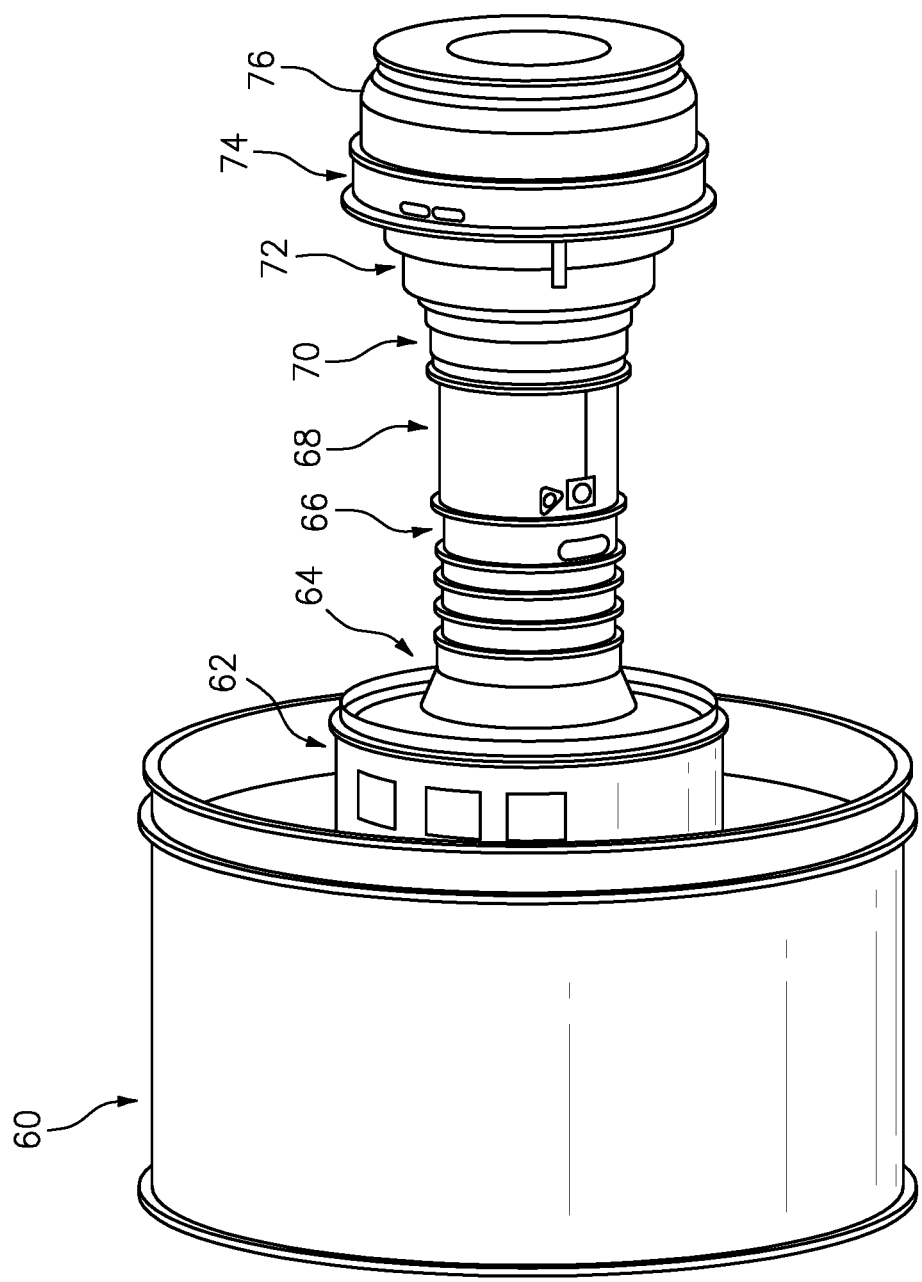
FIG. 2 is a perspective view of the engine modules of the engine.

With reference to FIG. 2, the engine case assembly 36 generally includes a plurality of modules, including a fan case module 60, an intermediate case module 62, a low pressure compressor (LPC) module 64, a high pressure compressor (HPC) module 66, a diffuser module 68, a high pressure turbine (HPT) module 70, a turbine intermediate case (TIC) module 72, a low pressure turbine (LPT) module 74, and a turbine exhaust case (TEC) module 76. It should be appreciated that additional or alternative modules might be utilized.

Figure 3:
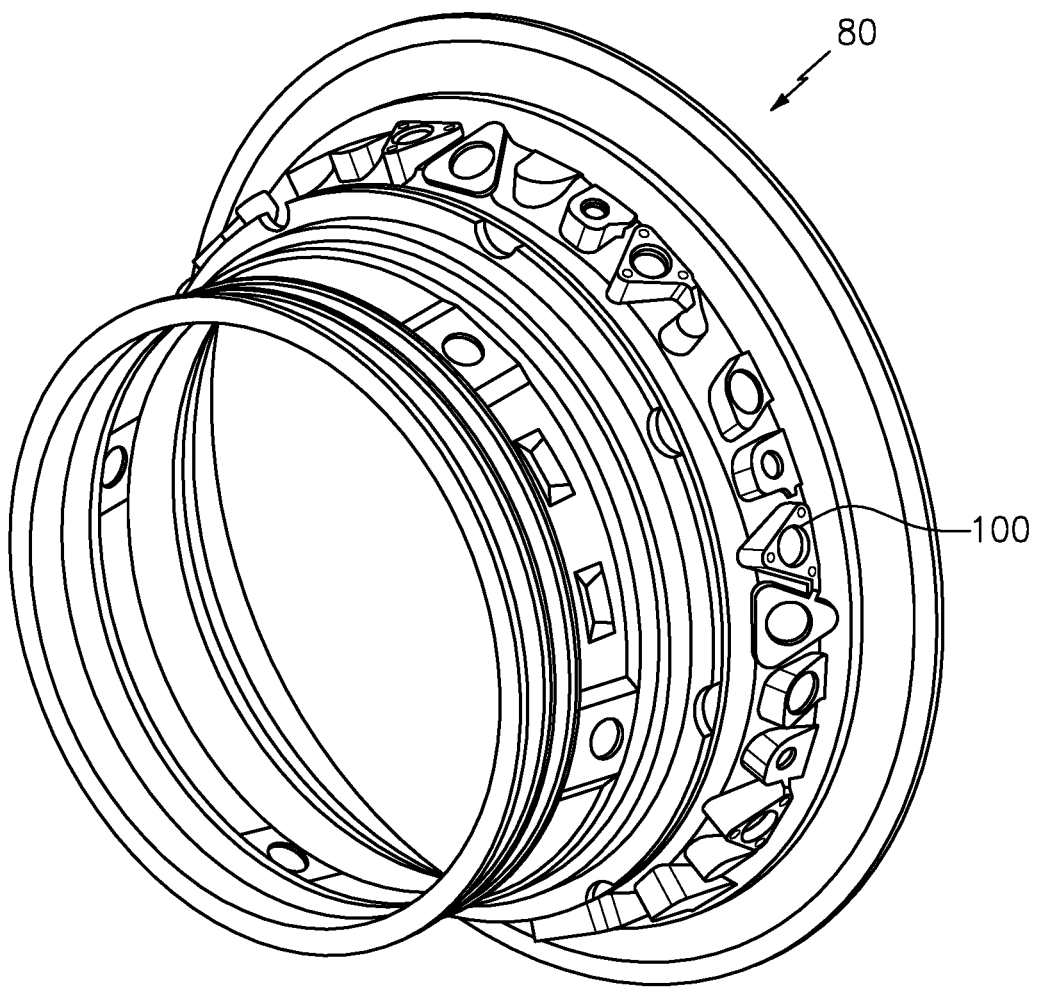
FIG. 3 is an expanded view of a Turbine Intermediate Case (TIC) module.
Figure 5:
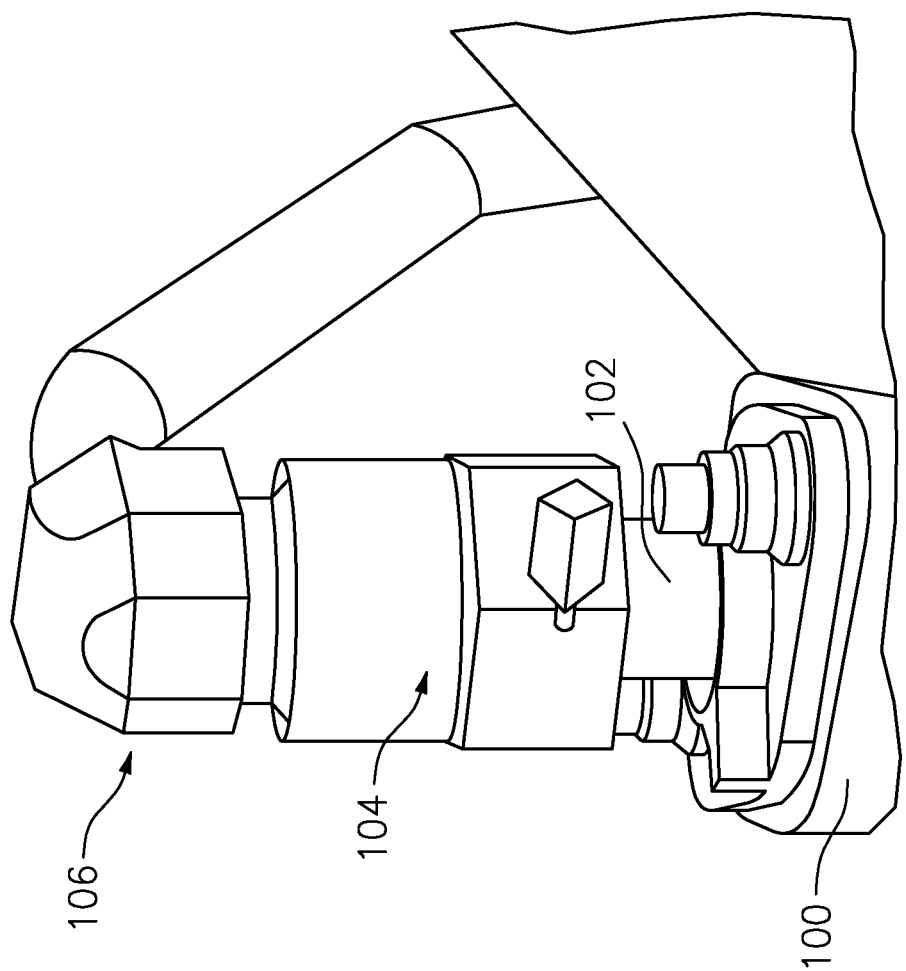
FIG. 5 is a perspective view of a coupling fitting connected to a lubricant system.
Figure 4:
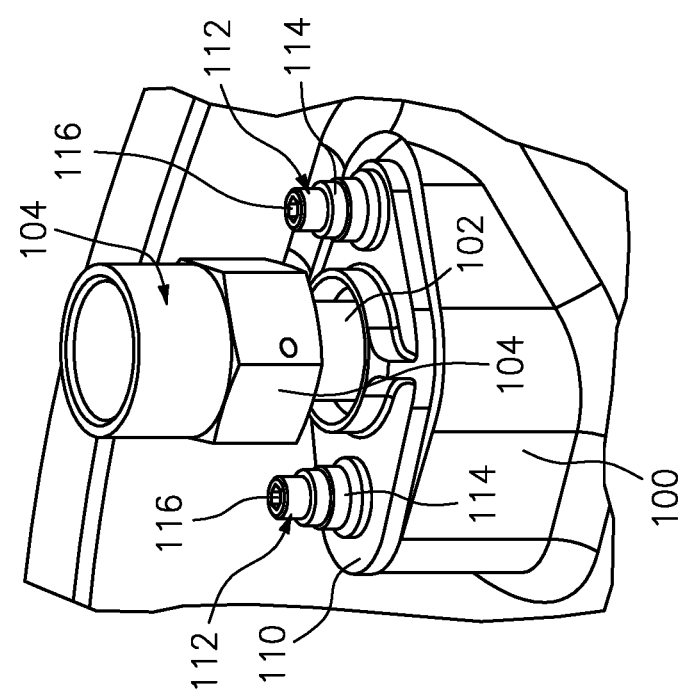
FIG. 4 is a perspective view of a coupling fitting and supply tube for connection of a lubricant system prior to receipt of the tool assembly.

With reference to FIG. 3, the TIC module 72 includes an outer TIC case 80 with one or more raised bosses 100 through which a supply tube 102 extends (FIG. 4). The supply tube 102 receives a coupling fitting 104 for later connection of a lubricant system tube 106 (FIG. 5). The coupling fitting 104 may include, but not be limited to, an AN818 coupling fitting, T-sleeve, AN819 fitting, AC811 series fitting, or other such fitting which are commonly referred to as a "B-nut." It should be appreciated that although the coupling fitting 104 is mounted to the supply tube 102, various other couplings, conduits, and structures will benefit herefrom.

Figure 6:
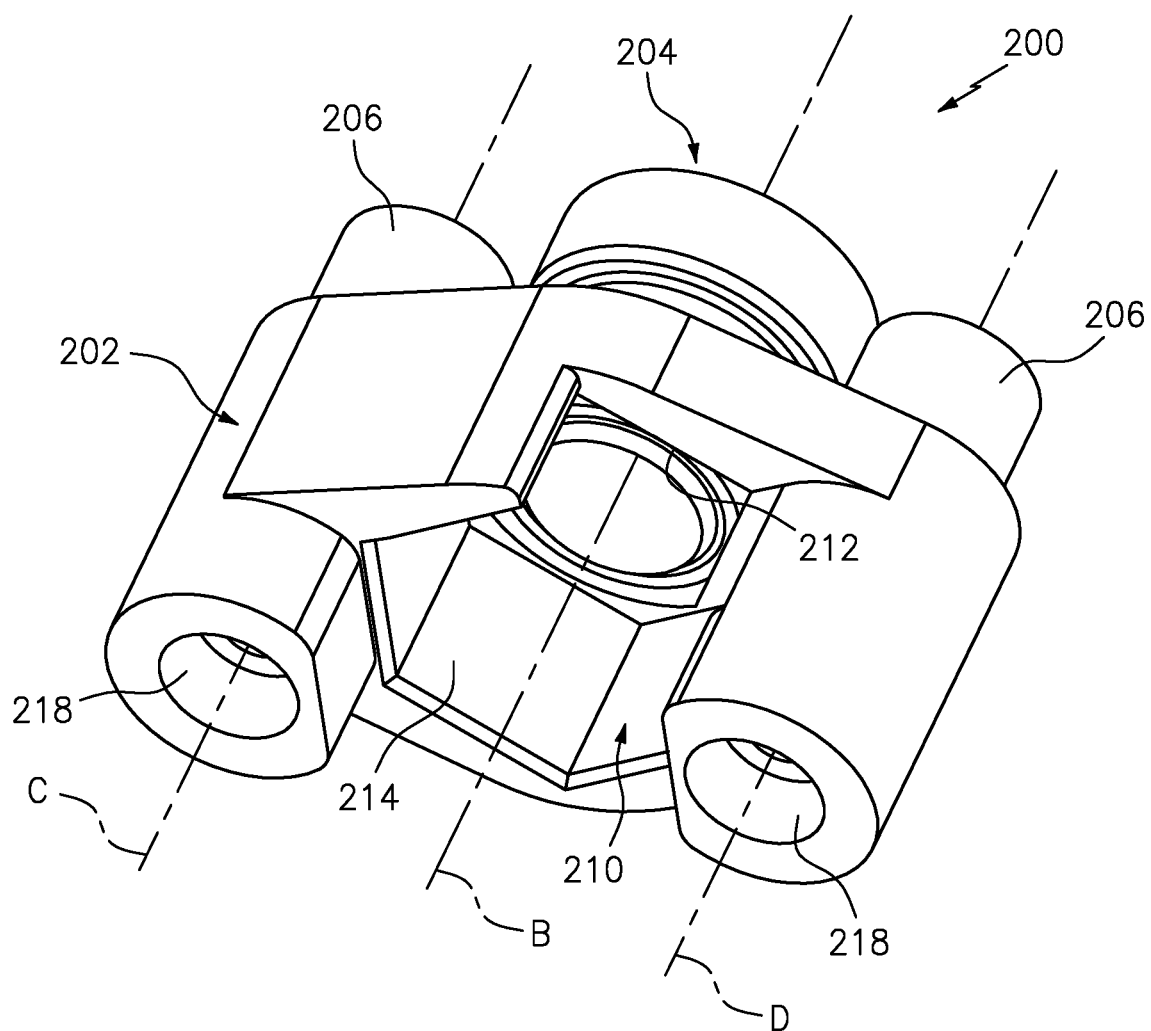
FIG. 6 is a perspective view of a tool assembly.

With reference to FIG. 6, a tool assembly 200 for attachment of a coupling fitting 104 generally includes a body 202, a cap 204, and a first and second retainer 206. The cap 204 may be attached to the body 202 with a lanyard 208 (identified in FIGS. 9 and 10).

Figure 7:
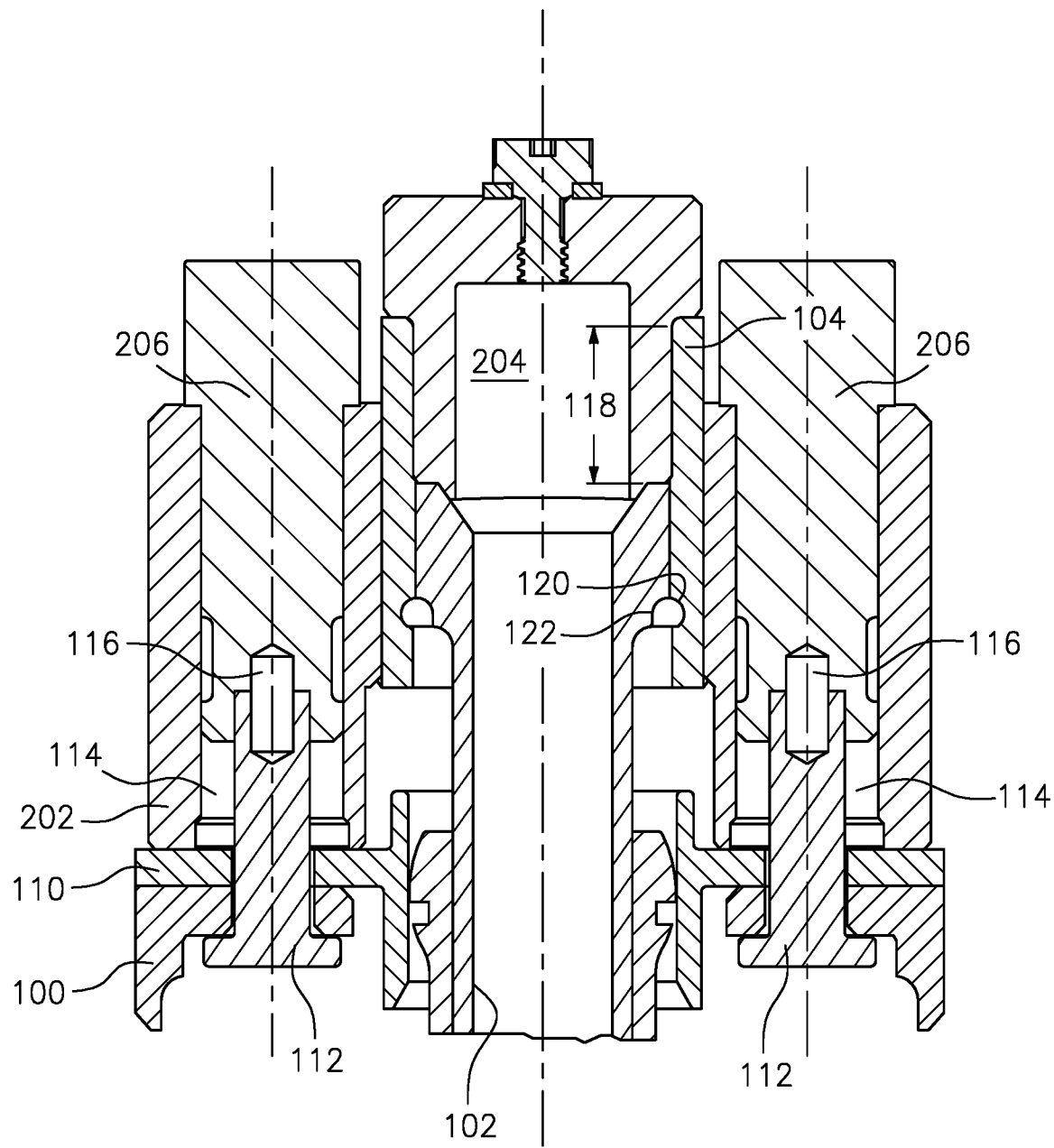
FIG. 7 is a sectional view of the tool assembly.

The body 202 generally includes an aperture 210 to receive the coupling fitting 104 along an axis B (FIG. 7). The aperture 210 includes a cylindrical portion 212 and a hexagonal portion 214 along the axis B. The cylindrical portion 212 and the hexagonal portion 214 correspond with sections of the coupling fitting 104 such that the body 202 will prevent rotation thereof when the body 202 is mounted to the boss 100. The body 202 is mounted to the boss 100 via the first and second retainer 206 which are mounted through a respective first and second aperture 218 in the body 202. The first and second apertures 218 are defined, respectively, along axes C, D. In this embodiment, the axes B, C, and D are contained within a common plane.

Figure 8:
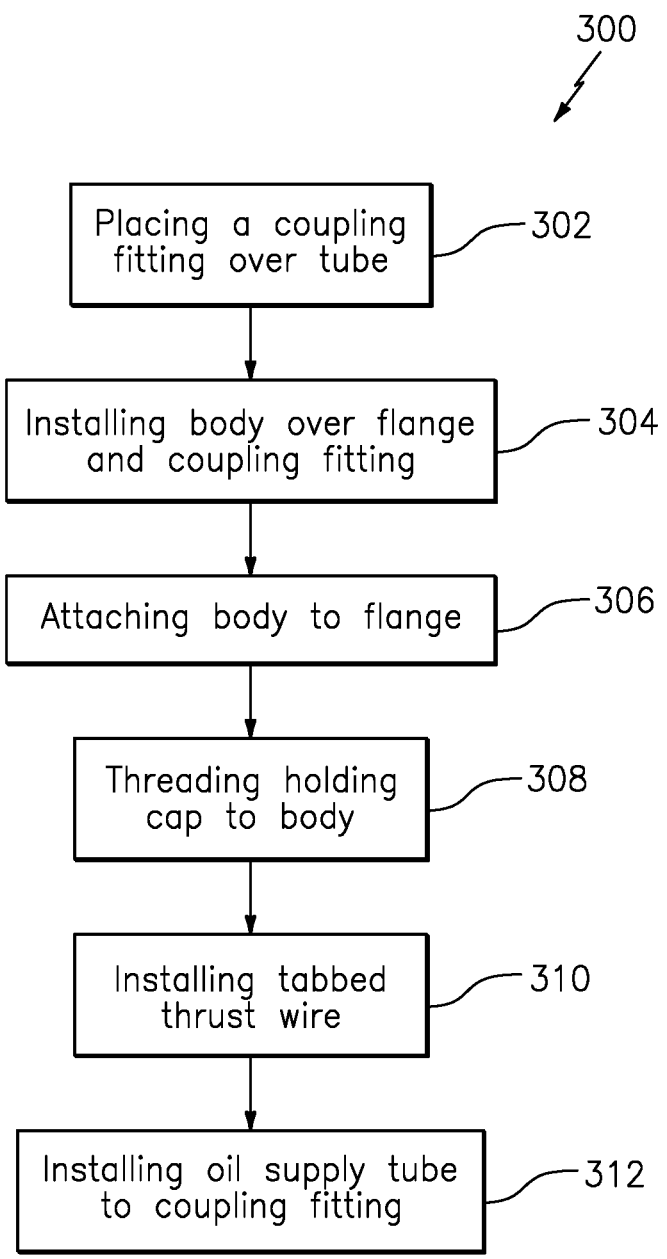
FIG. 8 is a flow diagram illustrating a method of installing a coupling fitting with the tool assembly.

With reference to FIG. 8, a method 300 to install the coupling fitting 104 to the supply tube 102 is disclosed in terms of a flow diagram. Initially, the coupling fitting 104 is positioned over the supply tube 102 (step 302; FIG. 4). In this example, a flange 110 has already been fastened to the boss 100 with respective bolts 112 and nuts 114. A distal end 116 of each bolt 112 extends through the nuts 114.

Figure 9:
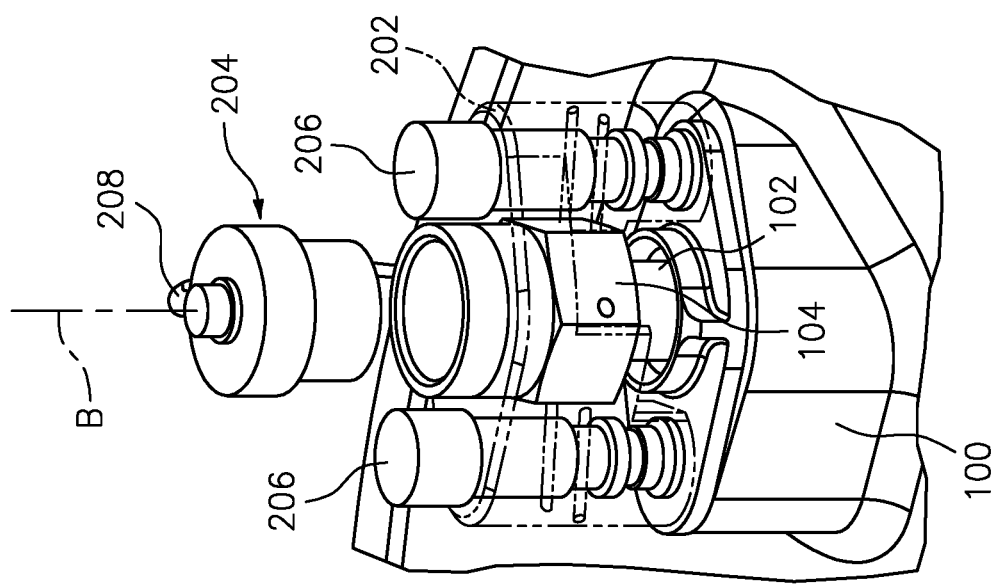
FIG. 9 is a perspective view of one step of installing the coupling fitting into the tool assembly and the coupling fitting being rotationally restrained by the case.

Next, the body 202 is mounted onto the flange 110 (step 304; FIG. 9). The first and second retainers 206 are then threaded onto the respective distal end 116 of each bolt 112 that extends through the nuts 114 (step 306; FIG. 9). The body 202 abuts the flange 110 and is retained by the first and second retainer 206. In other embodiments, the first and second retainer 206 may be, for example, a bolt that threads directly into the boss 100 or other component upon which the body 202 is in contact.

Figure 10:
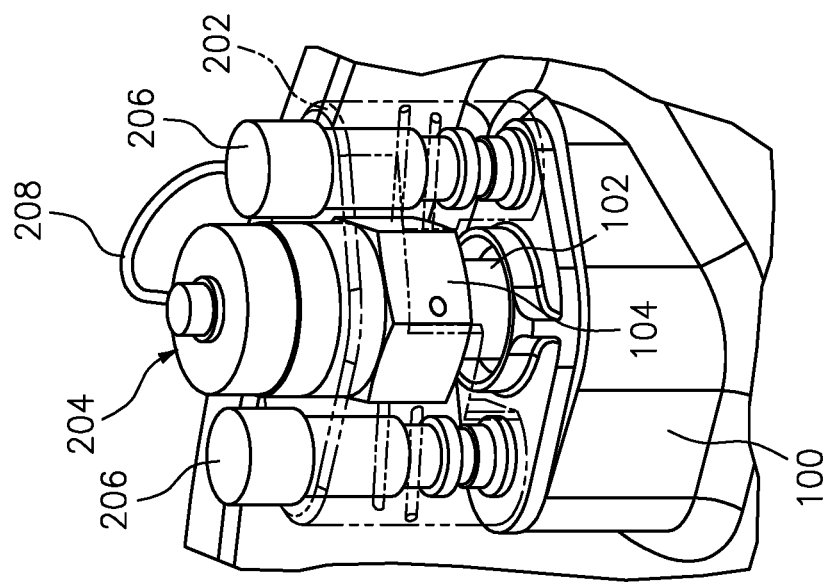
FIG. 10 is a perspective view of one step of installing the coupling fitting into the tool assembly and the coupling fitting being axially positioned by a cap.

Next, the cap 204 is threaded into the coupling fitting 104 (step 308; FIG. 10). The cap 204 includes an interface length 118 to properly axially locate the coupling fitting 104 such that a semi-circular groove 120 in the coupling fitting 104 is aligned with a semi-circular groove 122 in the supply tube 102 (FIG. 7).

Figure 12:
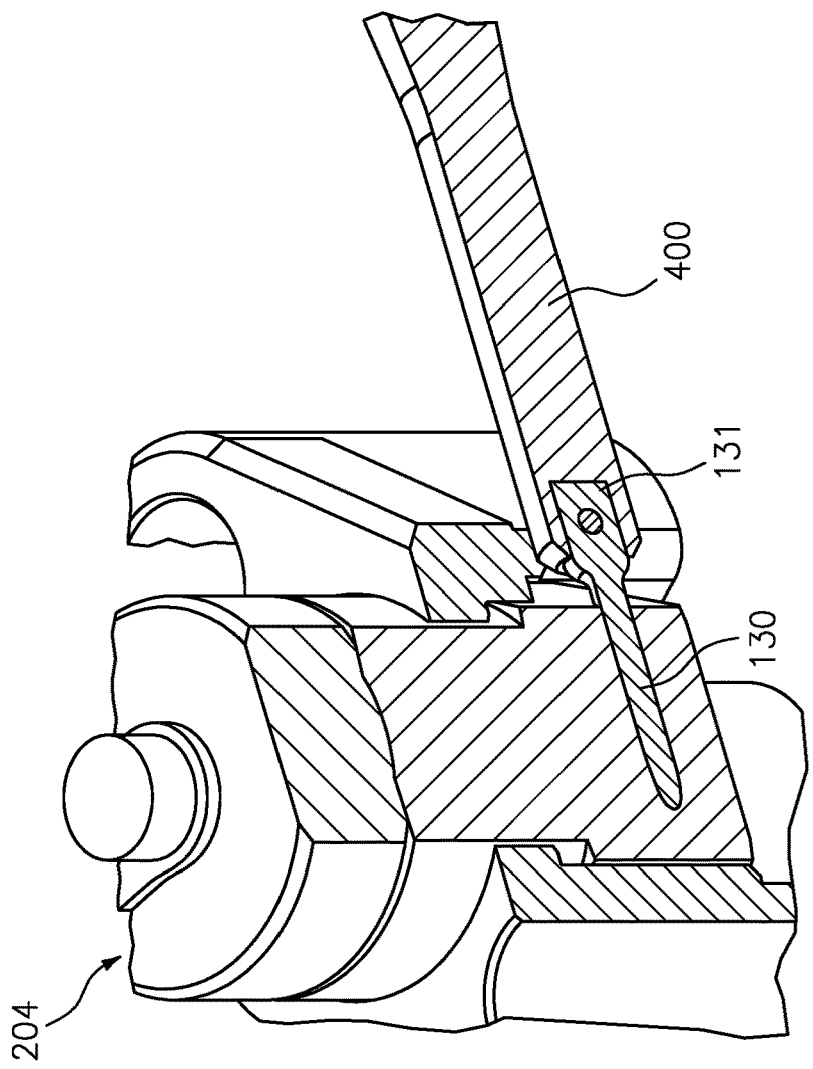
FIG. 12 is a perspective view of the thrust wire being installed with a dedicated pin punch therefor.
Figure 11:
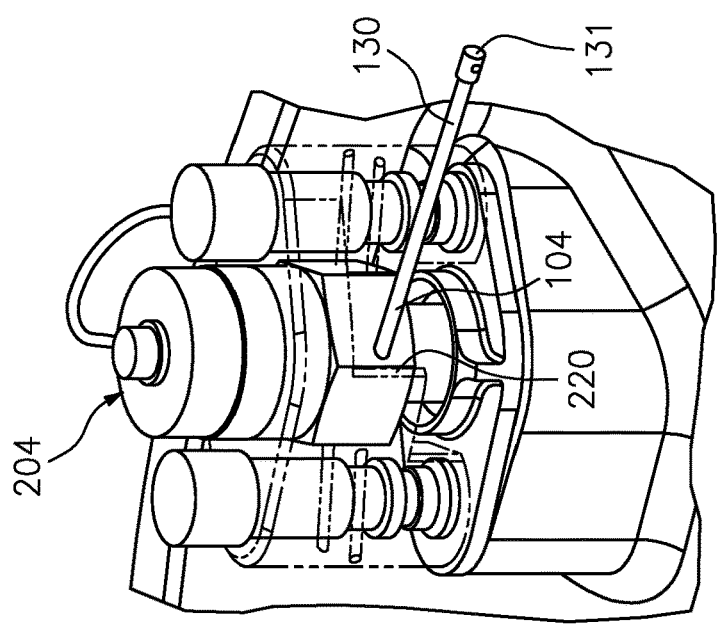
FIG. 11 is a perspective view of the thrust wire being located into the coupling fitting while being retained by the tool assembly.

Next, a tabbed thrust wire 130 is located in the groove formed by the semi-circular grooves 120, 122 (step 310; FIG. 11). The hexagonal portion 214 corresponds with the flats of the coupling fitting 104 such that the coupling fitting 104 is rotationally retained by the body 202. An opening 220 (FIG. 7) in the body 202 provides access for the tabbed thrust wire 130 and an associated punch 400 (FIG. 12).

Figure 14:
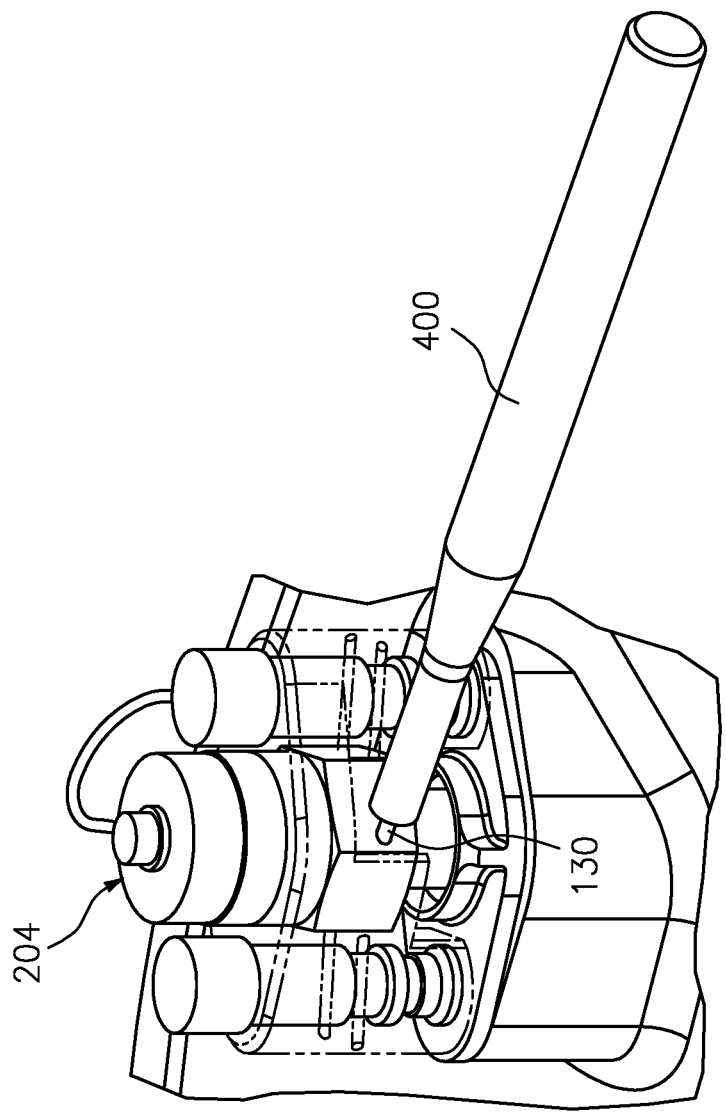
FIG. 14 is a perspective view of the thrust wire fully installed into the coupling fitting prior to removal of the tool assembly.

Next, the punch 400 is hammered or otherwise impacted to install the tabbed thrust wire 130 around the inner diameter of the coupling fitting 104 (step 312; FIG. 13 and FIG. 14). The specific dimensions of the punch 400 at least partially capture the tabbed thrust wire 130 to avoid slippage and assure receipt of appropriate hammer loads.

Finally, the tool assembly 200 is removed and the appropriate oil supply tube connection 500 is installed to the coupling fitting 104 (step 312; FIG. 5).

Figure 15:
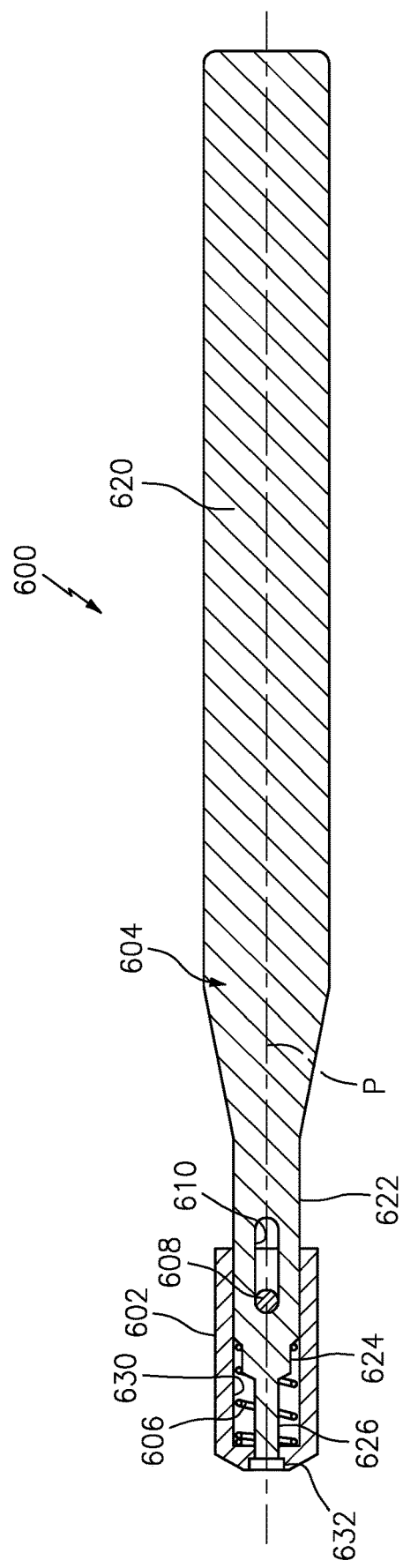
FIG. 15 is a perspective view of a punch assembly.

With reference to FIG. 15, a punch assembly 600 according to another disclosed non-limiting embodiment facilitates single technician installation for thrust wire hardware designs that are used in all industries that utilize tabbed or un-tabbed thrust wires. The punch assembly 600 includes a sleeve 602 that is spring biased to a punch 604 by a spring 606. The sleeve 602 is retained to the punch 604 by a pin 608. The pin 608 is received within a slot 610 in the punch 604 to control axial movement of the sleeve 602 with respect to an axis P of the punch between an extended position (FIG. 16) and compressed position (FIG. 17).

The punch 604 generally includes a handle section 620, a sleeve receipt section 622, a spring section 624 and a pin punch section 626. The punch 604 may be of a conventional length to facilitate manipulation by a single technician and impact by a standard hammer.

Figure 16:
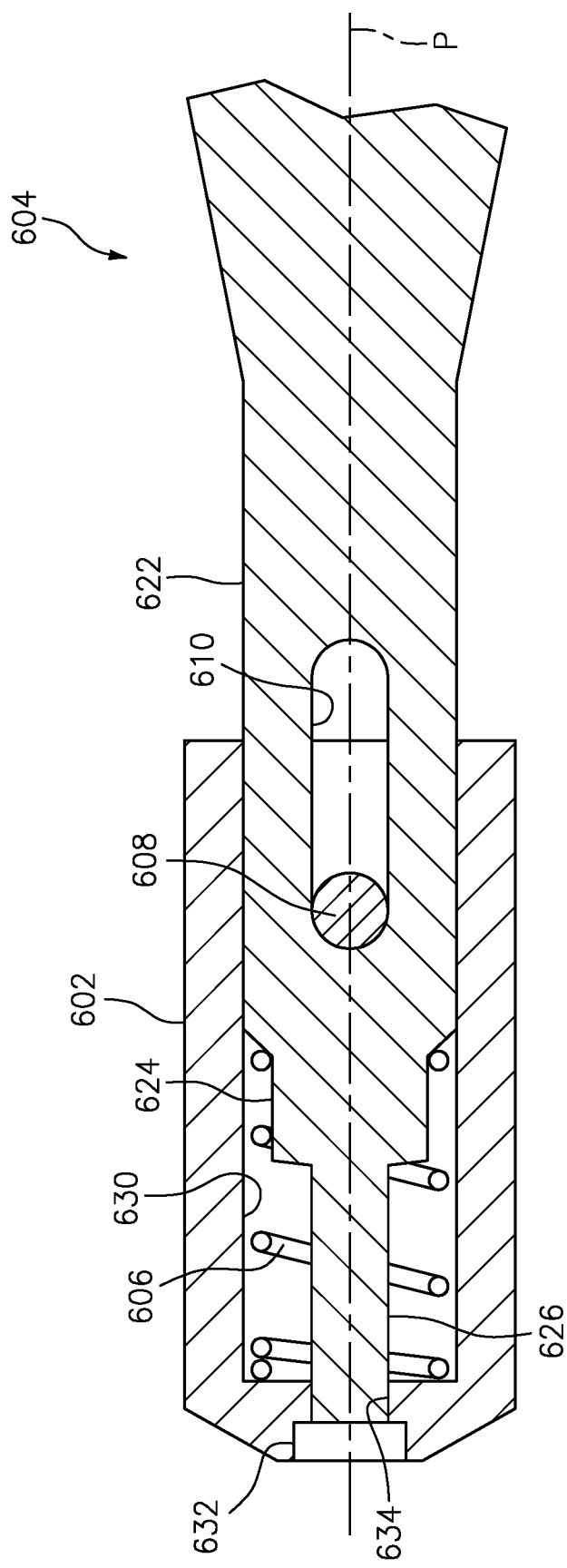
FIG. 16 is a perspective view of a punch assembly with a sleeve in an extended position.

The sleeve 602 includes a first guide section 630 which defines a diameter to closely fit and slide along the sleeve receipt section 622. The sleeve 602 also includes a thrust wire receipt section 632 and a second guide section 634 that closely fits and slides along and over the pin punch section 626. That is, the second guide section 634 fits over the pin punch section 626 (FIG. 16 and FIG. 17).

Figure 17:
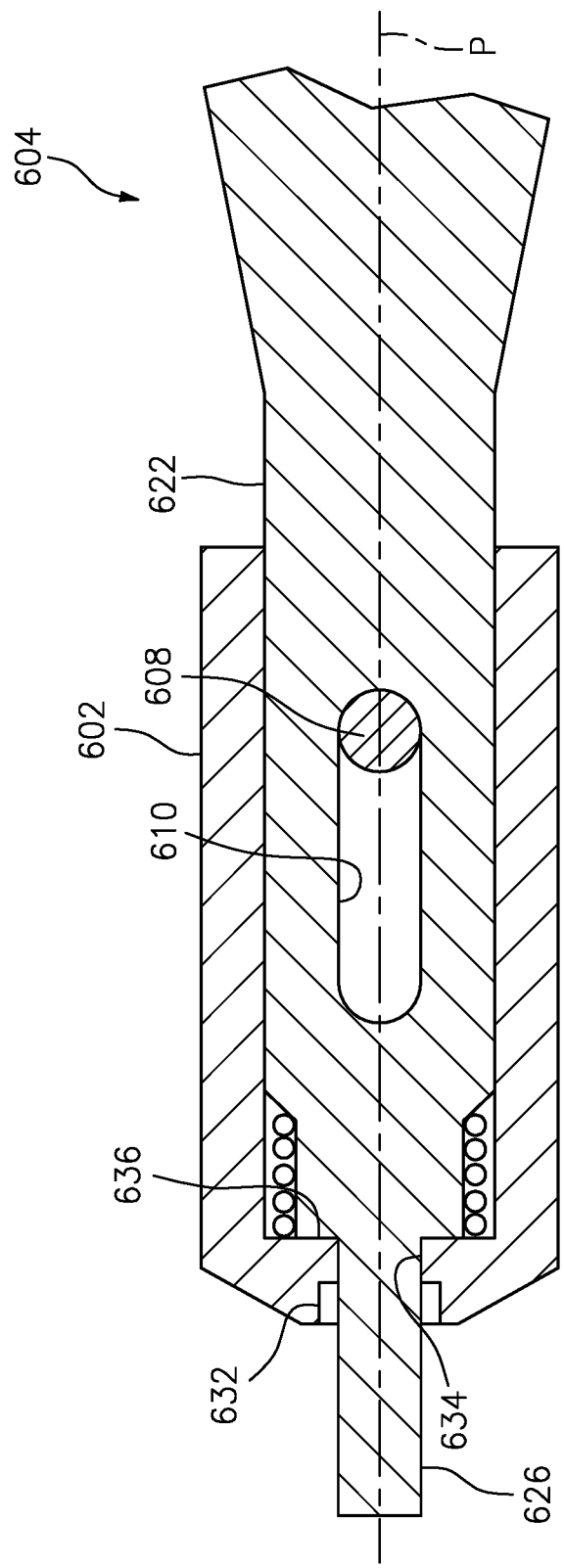
FIG. 17 is a perspective view of a punch assembly with a sleeve in a compressed position.

The second guide section 634 is smaller in diameter than the thrust wire receipt section 632 and is axially located to abut a stop surface 636 when the sleeve 602 is compressed along the axis P to the compressed position (FIG. 17). The stop surface 636 is a step transition between the spring section 624 and the pin punch section 626. The pin 608 within the slot 610 also controls axial movement of the sleeve 602 to minimize impact damage between the thrust wire receipt section 632 and the stop surface 636.

Figure 18:
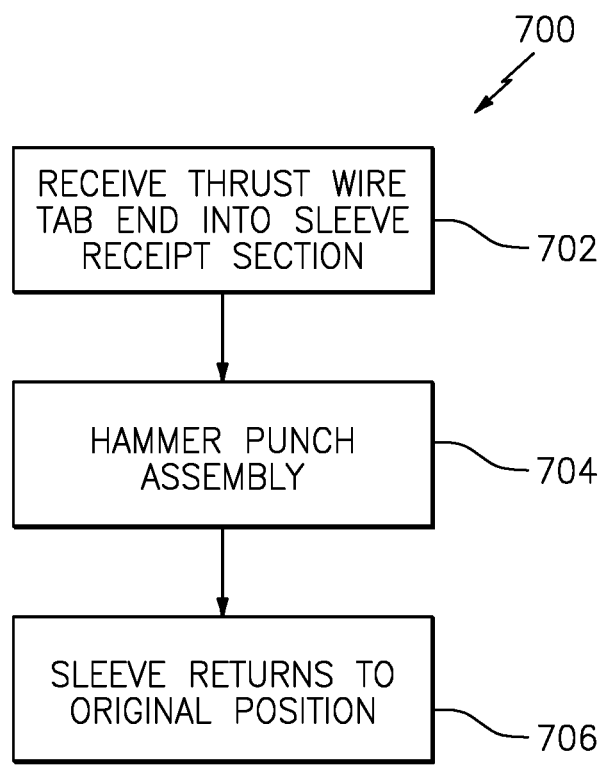
FIG. 18 is a flow diagram illustrating a method of installing a coupling fitting with the punch assembly.

With reference to FIG. 18, a method 700 to install the tabbed thrust wire 130 around the inner diameter of the coupling fitting 104 (as shown in step 312; FIG. 8) using the punch assembly 600 is disclosed.

Figure 19:
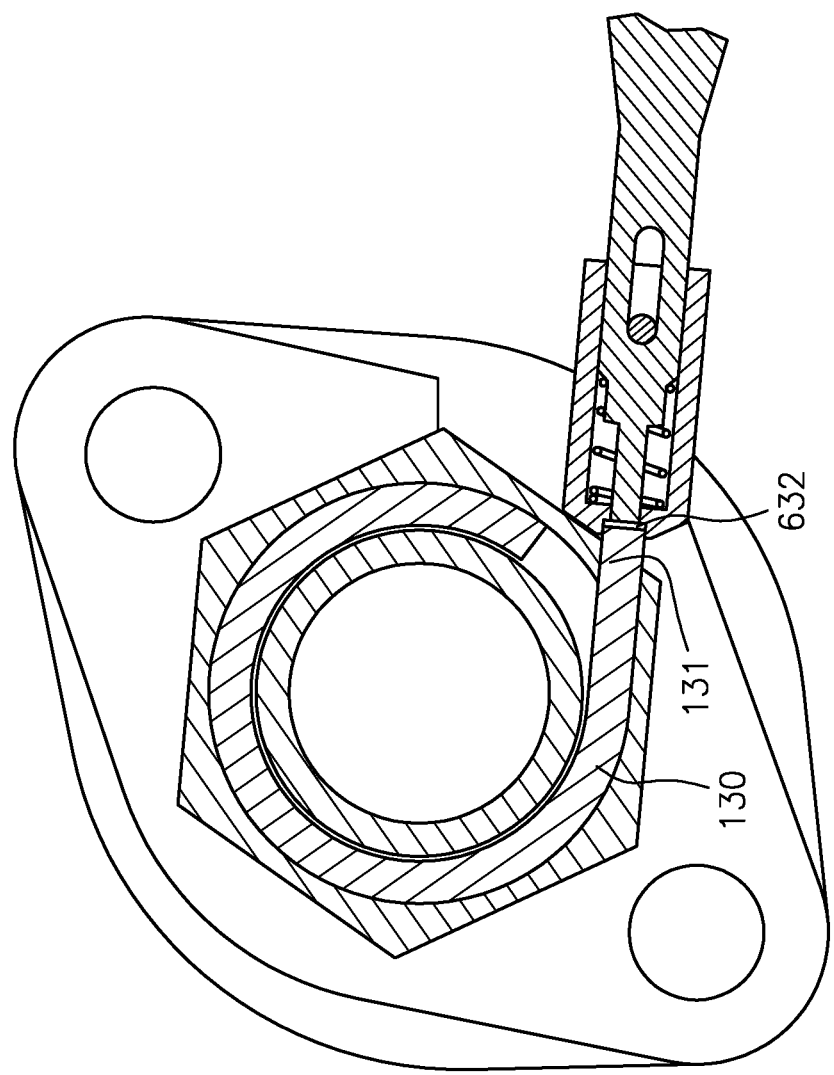
FIG. 19 is an installed view of the punch assembly in the extended position.

After the tabbed thrust wire 130 is located in the groove formed by semi-circular grooves 120, 122 (step 310; FIG. 11), the thrust wire receipt section 632 receives (702) a tab end 131 of the tabbed thrust wire 130 (FIG. 19). The thrust wire receipt section 632 closely receives and thereby at least partially retains the tab end 131. The punch assembly 600 is thereby highly unlikely to slip off the tab end 131.

Next, the handle section 620 may be positioned by a single technician and the handle section 620 struck with a common hammer by the technician without concern that the thrust wire receipt section 632 would slip off the tab end 131. The sleeve receipt section 622 is a guide to assure the impact is transferred to the tab end 131 when hammering (704).

Figure 20:
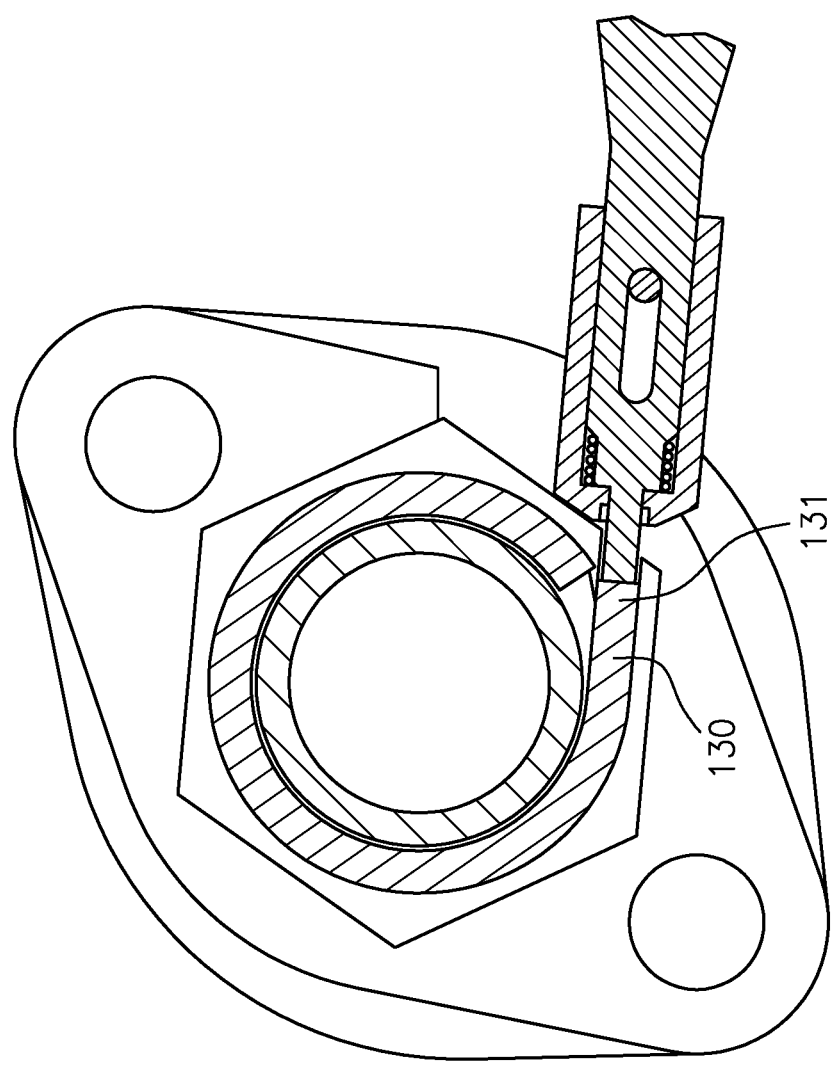
FIG. 20 is an installed view of the punch assembly in the compressed position.

The sleeve 602 also operates as a depth control mechanism for the tabbed thrust wire 130. That is, when the sleeve 602 is compressed along the axis P to the compressed position (FIG. 17), the pin punch section 626 extends a distance to properly seat the tab end 131 (FIG. 20).

Once the tabbed thrust wire 130 is hammered into place, the sleeve 602 returns (706) to the extended position (FIG. 16).

The punch assembly 600 fits over the tab end 131 of the tabbed thrust wire 130 to improve the piloting and stability while using a standard hammer. The punch assembly 600 also assists in depth control during installation of the tabbed thrust wire 130. The punch assembly 600 facilitates installation of the coupling fitting 104 into a one-man operation.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A punch assembly to install a thrust wire, comprising:
a punch that comprises a handle section, a sleeve receipt section, a spring section, and a pin punch section, wherein each section extends along a same axis and the handle section is adjacent to the sleeve receipt section, wherein the spring section is between the sleeve receipt section and the pin punch section, and the handle section is configured to receive a hammer load;
a sleeve that is spring biased to the punch, the sleeve comprising a first guide section which comprises a diameter to slide along the sleeve receipt section, a second guide section, and a thrust wire receipt section adjacent the second guide section, the second guide section smaller in diameter than the thrust wire receipt section, the thrust wire receipt section receives a tab end of a tabbed thrust wire;
a pin to retain the sleeve to the punch, the pin fits through a slot in the punch, the slot defines an axial distance between a compressed position and an extended position of the sleeve relative to the punch; and
a spring over the spring section and between the pin punch section and the sleeve such that the sleeve is movable axially along the axis between the extended position in which the pin punch section is aligned with a base of the thrust wire receipt section and the compressed position in which a majority of the pin punch section extends beyond the thrust wire receipt section and beyond an end of the sleeve a distance to seat the tab end, the second guide section axially located to abut a stop surface when the sleeve is moved along the axis to the compressed position, the stop surface is a step transition between the spring section and the pin punch section such that when the sleeve is moved from the extended position along the axis to the compressed position by the hammer load, the pin punch section extends a distance out of the sleeve to seat the tab end of the thrust wire.

2. A method to install a coupling fitting, comprising:
providing the punch assembly of claim 1,
receiving the sleeve of the punch assembly onto a tab end of a tabbed thrust wire, the sleeve movable axially along the axis between the extended position and the compressed position.

3. The method as recited in claim 2, further comprising:
installing the tabbed thrust wire into a groove formed by a semi-circular groove in the coupling fitting and a semi-circular groove in a supply tube; and
placing the coupling fitting over the supply tube, wherein axially positioning the coupling fitting includes defining an interface length with a cap to axially locate the coupling fitting within a coupling aperture to axially locate the coupling fitting such that the semi-circular groove in the coupling fitting is aligned with the semi-circular groove in the supply tube.

4. The method as recited in claim 3, further comprising:
mounting a tool body to a boss;
receiving the coupling fitting within a coupling aperture of the tool body to rotationally retain the coupling fitting;
inserting the cap into the coupling aperture; and
threading the cap into the coupling fitting to axially position the coupling fitting.

5. The method as recited in claim 4, further comprising threading a fastener through the tool body.

6. The method as recited in claim 5, further comprising threading the fastener through the tool body and onto a respective distal end of a bolt that retains a flange to the boss for mounting the tool body to the boss.

7. The method as recited in claim 2, further comprising hammering the punch assembly until the sleeve is moved axially along the axis between the extended position and the compressed position.

8. The method as recited in claim 2, further comprising placing the coupling fitting over a supply tube.

* * * * *